(12) United States Patent
Raju et al.

(10) Patent No.: US 12,072,776 B2
(45) Date of Patent: *Aug. 27, 2024

(54) HARDWARE CONTROL PATH REDUNDANCY FOR FUNCTIONAL SAFETY OF PERIPHERALS

(71) Applicant: Texas Instruments Incorporated, Dallas, TX (US)

(72) Inventors: Veeramanikandan Raju, Bangalore (IN); Anand Kumar G, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/166,787

(22) Filed: Feb. 9, 2023

(65) Prior Publication Data

US 2023/0185679 A1    Jun. 15, 2023

Related U.S. Application Data

(63) Continuation of application No. 17/409,029, filed on Aug. 23, 2021, now Pat. No. 11,604,709.

(30) Foreign Application Priority Data

Feb. 22, 2021  (IN) .............................. 202141007281

(51) Int. Cl.
*G06F 11/00* (2006.01)
*G06F 11/07* (2006.01)
(Continued)

(52) U.S. Cl.
CPC ...... *G06F 11/1616* (2013.01); *G06F 11/0745* (2013.01); *G06F 11/0757* (2013.01);
(Continued)

(58) Field of Classification Search
CPC ......... G05B 19/048; G05B 9/02; G06F 9/441; G06F 11/0745; G06F 11/0757;
(Continued)

(56) References Cited

U.S. PATENT DOCUMENTS 11,604,709 B2 * 3/2023 Raju .................. G06F 11/1441
2015/0121132 A1   4/2015 Tian et al.
2017/0075760 A1   3/2017 Ozer et al.

* cited by examiner

*Primary Examiner* — Michael Maskulinski
(74) *Attorney, Agent, or Firm* — Michael T. Gabrik; Frank D. Cimino

(57) ABSTRACT

A circuit includes a primary register region and a primary shadow register; a secondary register region and a secondary shadow register; and a safety controller having multiple states. The safety controller transitions to a first write state when a first write signal to write a first value to the primary register region is detected, and copies the first value written to the primary register region to the primary shadow register; transitions to a second write state when a second write signal to write a second value to the secondary register region is detected within a set amount of time of detection of the first write signal, and in the second write state, copies the second value written to the secondary register region to the secondary shadow register; transitions to a compare state to receive a comparison signal indicating whether the first value is the same as the second value; and transitions to an update state when the first value is the same as the second value.

19 Claims, 6 Drawing Sheets

(51) Int. Cl.
*G06F 11/14* (2006.01)
*G06F 11/16* (2006.01)
*G06F 13/20* (2006.01)

(52) U.S. Cl.
CPC .......... *G06F 11/1441* (2013.01); *G06F 13/20* (2013.01); *G06F 2201/805* (2013.01)

(58) Field of Classification Search
CPC ............. G06F 11/1412; G06F 11/1441; G06F 11/1608; G06F 11/1612; G06F 11/1616; G06F 11/1629; G06F 11/1637
See application file for complete search history.

HARDWARE CONTROL PATH REDUNDANCY FOR FUNCTIONAL SAFETY OF PERIPHERALS

CROSS-REFERENCE TO RELATED APPLICATIONS

This application claims priority under 35 U.S.C. § 120 to U.S. application Ser. No. 17/409,029, filed Aug. 23, 2021, which claims priority under 35 U.S.C. § 119 to India Provisional Application No. 202141007281, filed Feb. 22, 2021, both of which are hereby incorporated by reference.

BACKGROUND

Increasingly, computing hardware is used in safety and mission-critical applications where the computing hardware is expected to resist failure or continue operating despite errors, such as hardware errors. Redundancy may be used to help provide this fault tolerance. Often this redundancy may be provided through redundancy of computing hardware, such as processor, storage, sensors, peripherals, etc., performing the computation with a primary computing unit and a redundant computing unit, and comparing the output from the primary computing unit against the output from a redundant computing unit to determine whether the outputs are consistent with each other.

One source of errors in computing systems includes single event upset, or soft errors, in which a signal or data is changed, disrupting the computing system. These disruptions may be caused by radiation, high energy particles, etc., which can cause, among other possible errors, bit flips or other such data corruption. If data including such an error is passed from one component of a computing system to another, such as from a processor to a peripheral, the error can further cause downstream issues, such as data corruption/loss, erroneous operation of components, etc. While duplicate computing systems can help detect such errors, completely duplicating the computing hardware can be expensive. Techniques which maintain functional safety, that is, the overall safety of a system, while reducing costs, for example as compared to completely duplicating the computing system, may be useful.

SUMMARY

In an aspect, this disclosure relates to a circuit that comprises a primary register region and a primary shadow register; a secondary register region and a secondary shadow register; and a safety controller having multiple states. The safety controller is operable to transition to a first write state when a first write signal to write a first value to the primary register region is detected, and copy the first value written to the primary register region to the primary shadow register; transition to a second write state when a second write signal to write a second value to the secondary register region is detected within a set amount of time of detection of the first write signal, and in the second write state, copy the second value written to the secondary register region to the secondary shadow register; transition to a compare state to receive a comparison signal indicating whether the first value is the same as the second value; and transition to an update state when the first value is the same as the second value.

Another aspect of the present disclosure relates to a circuit that comprises primary and secondary register regions; a plurality of pairs of registers, including a first pair of registers coupled to the primary and secondary register regions; and a plurality of comparators coupled to the plurality of pairs of registers, respectively. In this arrangement, each comparator is configured to compare values in one register of the corresponding pair of registers to respective values in the other register of the corresponding pair of registers and to output a corresponding comparison signal indicating whether the compared values are the same. The circuit further comprises a safety controller coupled to the plurality of comparators to receive the comparison signals. The safety controller has an output, and is configured to assert a safety warning signal when any of the comparison signals indicate that the compared values are not the same.

Other aspects of the present disclosure relate to larger structures, e.g., devices, that may include any of the circuits described herein, as well as methods that may be implemented according to the circuit functionality.

BRIEF DESCRIPTION OF THE DRAWINGS

For a detailed description of various examples, reference will now be made to the accompanying drawings in which.

DETAILED DESCRIPTION

Often, computing hardware and systems are configured to monitor and/or operate various peripherals. Such systems often include a data path to interface with the peripheral as well as a control path to configure and/or control the operations of the computing hardware. In some cases, information carried on the data path changes often when the peripheral is operating, and the likelihood that any single error on the data path will cause a safety-related fault is small, as the data can be updated quickly, clearing the error. For example, a real-time sensor may provide data from the sensor multiple times per second, and a single error in the data may be ignored or smoothed out by non-erroneous data received after the single error. Information on the control path, however, can be infrequently changed and remain relatively static for relatively long periods of time. For example, a real-time sensor may be configured via the control path when powered on and only reconfigured when power cycled. A transient error on the control path can be more problematic, as the error may result in undesired and/or incorrect operation of the computing hardware rather than a transient error on the data path. Thus, a high level of functional safety may be obtained by providing a level of redundancy for the control path of a peripheral. Generally, a peripheral may provide connectivity, services, and/or interfaces for a processor. Examples of peripherals include, but are not limited to, universal serial bus (USB), multimedia card (MMC), display connectivity, and graphical operations, for example, via a graphics processing unit or other image processing hardware, sensors, PCI express (PCIe) interface, etc. In some cases, the processor and some peripherals may be integrated together, for example, on a system on a chip (SoC).

Figure 1:
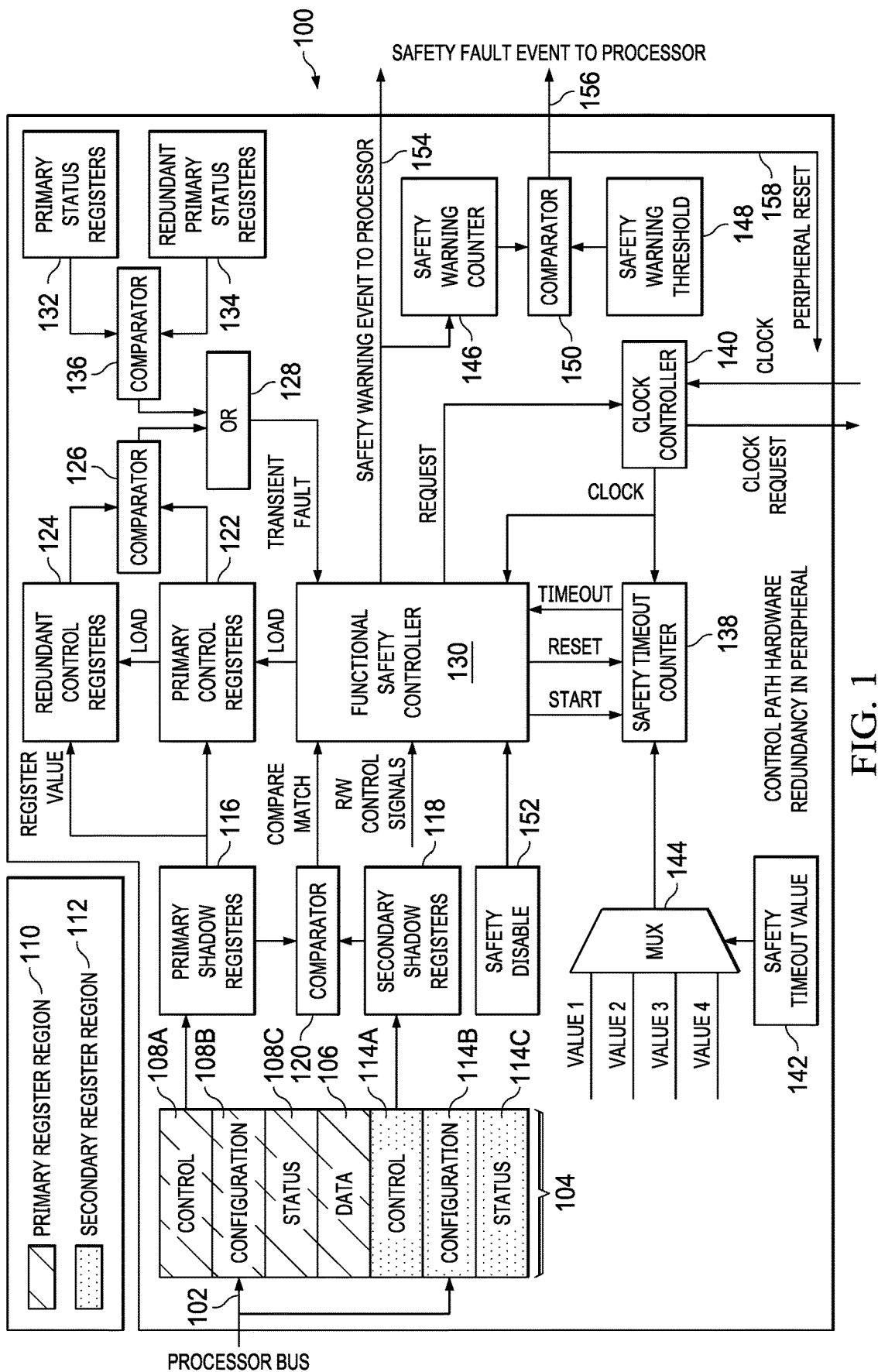
FIG. 1 is a block diagram of a peripheral with control path redundancy, in accordance with aspects of the present disclosure.

FIG. 1 is a block diagram of a peripheral 100 with control path redundancy, in accordance with aspects of the present disclosure. It may be understood that, for clarity, the components of peripheral 100 as shown focus on aspects of the control path for peripheral 100. It should be understood that peripheral 100 may include other components that are not shown. As shown, the peripheral 100 may be coupled to one or more processors via a processor bus 102 that is communicatively coupled to a set of registers 104. The registers are used to communicate, by the peripheral 100, with the coupled one or more processors. For example, a processor may pass data to the peripheral 100 by writing to one or more of registers of the set of registers 104, and the peripheral 100 may pass data to the processor by writing data to one or more registers of the set of registers 104. The set of registers 104 may include multiple regions, including a primary register region 110 and a secondary register region 112.

In some cases, the set of registers 104 may be memory-mapped registers. Where the registers are memory mapped, accessing a specific memory address, for example, by a processor, accesses a specific register of the peripheral. For example, certain memory addresses, such as memory addresses 0-7 accessible by the processor, may be mapped to registers of the peripheral 100, such as registers 7-14, corresponding with configuration registers 108B. A range or region of memory addresses corresponding to a set of registers, such as the primary register region 110 and/or secondary register region 112, may be referred to as an aperture (e.g., primary register aperture and secondary register aperture). For example, the primary register region 110 may be associated with a primary aperture or range of memory addresses with a certain base (e.g., starting) memory address, and the secondary register region 112 may be associated with a secondary aperture or range of memory addresses with a different base memory address. In some cases, the primary aperture and the secondary aperture may together form a continuous range of memory addresses.

The register regions of the set of registers 104 may be further divided based on the intended purpose of the registers. For example, register regions of the set of registers 104 may include both control type registers as well as data registers. In this example, the primary register region 110 includes both data registers 106 and control type registers 108. The control type registers 108 may include control registers 108A, configuration registers 108B, and status registers 108O. The secondary register region 112 in this example includes the control type registers 114, which includes control registers 114A, configuration registers 114B, and status registers 114C, but does not necessarily include corresponding data registers. The control type registers 114 of the secondary register region 112 correspond to the control type registers 108 of the first register region 110.

In this example, the primary register region 110 is coupled to primary shadow registers 116 and the secondary register region 112 is coupled to secondary shadow registers 118. The primary shadow registers 116 and the secondary shadow registers 118 are both coupled to comparator 120, which is in turn coupled to a functional safety controller (FSC) 130. The FSC 130 may be implemented by a finite state machine, other hardware, software, or any combination thereof. As an example, the FSC 130 may include hardware implementing a finite state machine for updating and/or setting the primary control registers for controlling the peripheral 100. The primary shadow registers 116 are further coupled to primary control registers 122 and redundant control registers 124. The primary control registers 122 may be the registers that are used during operations of the peripheral 100 to control the operations of the peripheral 100, and the redundant control registers 124 may be a copy of the primary control registers 122. The primary control registers 122 and the redundant control registers 124 may be coupled to a comparator 126, which compares the values stored in the primary control registers 122 and the redundant control registers 124 to verify that the values are the same. The comparator 126 is coupled to a switch 128, which is coupled to the FSC 130. If the comparator 126 determines that the primary control registers 122 and the redundant control registers 124 match, then the values in primary control registers 122 and the redundant control registers 124 are used, for example, to control the peripheral. If comparator 126 determines that the primary control registers 122 and the redundant control registers 124 do not match, the comparator 126 may send an indication, such as a transient fault indication, to switch 128.

In some cases, switch 128 may also be coupled to one or more primary status registers. In this example, the peripheral includes one or more primary status registers 132. The peripheral also includes one or more redundant primary status registers 134, which correspond with the one or more primary status registers 132. The primary status registers 132 and the redundant primary status registers 134 are coupled to comparator 136, and comparator 136 is coupled to switch 128. In some cases, the primary status registers 132 may be coupled to the primary shadow registers 116 (not shown) and the redundant primary status registers 134 may be coupled to the secondary shadow registers 118 (not shown).

The FSC 130 is also coupled to a safety timeout counter 138, which is coupled to and receives a clock signal from a clock controller 140. The safety timeout counter 138 is coupled to and receives a safety timeout value 142 via mux 144. The FSC 130 is also coupled to and configured to send safety warning events 154 to the processor. The FSC 130 is also coupled to and configured to send safety warning events to a safety warning counter 146, and a value of the safety warning counter 146 may be output to a coupled comparator 150. A safety warning threshold 148 is also input to the comparator 150, and when the value of the safety warning counter 146 matches and/or exceeds the safety warning threshold 148, a safety fault event 156 may be output to the processor and/or the peripheral reset 158. In some cases, the safety warning threshold 148 may be configurable, for example, by an application. In some cases, a safety disable signal may also be input to a safety disable register 152 of the FSC 130.

As shown, the set of registers 104 may be split into two general regions, the primary register region 110 and the secondary register region 112. The primary register region 110 may include a set of control registers 108 corresponding to the primary control registers 122 (e.g., a full set of control registers for controlling the peripheral 100) as well as the data registers 106. The secondary register region 112 also contains a full set of control registers 114 for controlling the peripheral 100. While in this example, the secondary register region 112 does not include data registers, in other cases, the secondary register region 112 may include data registers and data register redundancy may be implemented in a substantially similar way to control register redundancy as described herein.

The secondary register region 112 helps provide redundancy by ensuring that a control signal is correctly received. In accordance with aspects of the present disclosure, a control signal, such as one received from a processor, may be received by and written into the control registers 108 of the primary register region 110. The values written into the control registers 108 may be stored in the primary shadow registers 116. When a write to the control registers 108 of the primary register region 110 and/or primary shadow registers 116 is detected, a safety timeout counter 138 may be started by, for example, the FSC 130 while waiting for a second control signal.

If a second control signal is received by and written into the control registers 114 of the secondary register region 112, the values written into the secondary register region may be stored in the secondary shadow registers 118. The values stored in the primary shadow registers 116 may be compared to the values stored in the secondary shadow registers 118 by, for example, the comparator 120. The comparator 120 may indicate to the FSC 130 whether the values match.

If the comparator 120 indicates to the FSC 130 that the values match, then the FSC 130 may indicate to the primary control registers 122 and the redundant control registers 124 to load the values from the primary shadow registers 116 for use by the peripheral 100. The FSC 130 may also indicate to the safety timeout counter 138 to reset the safety timeout counter. The values loaded into the primary control registers 122 and the redundant control registers 124 may be compared by comparator 126. The values in the primary control registers 122 are used to control the peripheral 100. In some cases, the comparator 126 may continue to monitor the primary control registers 122 and redundant control registers 124 to ensure that values stored in the control registers are consistent. If the values in the primary control registers 122 and redundant control registers 124 become inconsistent, for example, due to a bit flip event, then the comparator 126 may send an indication, such as a transient fault indication, to switch 128.

In some cases, a control signal, such as one received from a processor via processor bus 102, may be a read request for information stored in a status register. Status registers, such as status registers 108C and 114C, may include information about the peripheral and may be updated by the peripheral 100 based on one or more states of the peripheral. When a read request is received for one or more registers of the status registers 108C, a value stored in the corresponding registers of the primary status register 132 may be read into the primary shadow registers 116 and status register 108C for return via the processor bus 102.

To help ensure that the received read request was an intentional read request, the control path redundancy may require that a second, corresponding read request for one or more corresponding registers of status registers 1140 be received within a certain time period, as a received read request for may change one or more internal states of the peripheral 100. For example, when a read request for a value of a register of the status registers 108O is received, an indication of the received read request may be recorded in the status registers 108O and/or corresponding registers of the primary shadow registers 116. The safety timeout counter 138 may be started, by, for example, the FSC 130 while waiting for the second read request.

If the second read request for one or more corresponding registers of status registers 114C is received before the safety timeout counter 138 has expired, then an indication of the received read request may be recorded in status registers 114C and/or corresponding registers of the secondary shadow registers 118. A value stored in the corresponding registers of the redundant primary status registers 134 may be read into the secondary shadow registers 118 and status registers 114C. If the second read request is not received before the safety timeout counter 138 expires, the FSC 130 may transmit an indication of a safety warning event 154, for example, to the processor, and any indications of the received read request recorded in the primary shadow registers 116 are ignored.

In some cases, the peripheral 100 may update a status register in the primary status registers 132 and a corresponding status register in the redundant primary status registers 134. The values of registers in the primary status registers 132 are compared with the values of registers in the redundant status registers 134 by comparator 136 to verify that the values are the same. If comparator 136 detects that values of registers in the primary status registers 132 do not match values of registers in the redundant status registers 134, then comparator 136 may send an indication of the mismatch, such as a transient fault indication, to switch 128.

If either comparator 136 or comparator 126 indicates to switch 128 that there was a mismatch in their corresponding register values, the switch 128 may pass on the indication to the FSC 130. The FSC 130 may then transmit an indication of a safety warning event 154, for example, to the processor.

In some cases, a safety warning counter 146 may be incremented each time a safety warning is transmitted. This safety warning counter 146 may be compared, for example, by comparator 150, to the safety warning threshold 148, and if the safety warning counter 146 exceeds or is equal to the safety warning threshold 148, a safety fault event 156 may be transmitted, for example, to the processor, and/or the peripheral 100 may be reset 158.

The processor, upon receiving the safety warning event 154 and/or the safety fault event 156 may take an application-controlled action and attempt to address the safety warning event 154 and/or the safety fault event 156.

As discussed above, after a value is written to the control registers 108 of the primary register region 110 and/or primary shadow registers 116, the safety timeout counter 138 is started. The safety timeout counter 138 is set based on the safety timeout value 142. The safety timeout value 142, in some cases, may be preconfigured, such as during a boot initialization of the peripheral or hard-coded at the factory. In some cases, the safety timeout value 142 may be configured, for example, during a development and/or configuration process and loaded during boot up. In some cases where the safety timeout value 142 is configured during boot up, the safety timeout value 142 may be locked from modification while the device is running. The safety timeout counter 138 may count clock ticks from the clock controller 140. If the safety timeout counter 138 expires without an indication from the comparator 120 that a second signal with a value matching the value in the first signal was received (e.g., the second signal was not received), then the values in the primary shadow registers 116 are ignored and not loaded into the primary control registers 122, and the FSC 130 may transmit an indication of a safety warning event 154, for example, to the processor.

In some cases, the FSC 130 may include a safety disable register 152. The safety disable register 152 may disable the control path redundancy for the peripheral 100. In some cases, the control path redundancy for the peripheral 100 is disabled, the primary register region 110 may be used, and the secondary register region 112 may be ignored. In some cases, the safety disable register 152 may be configured, for example, during boot up of the peripheral 100.

In cases where read-to-clear registers are used for the control registers 108 of the primary register region 110 and/or control registers 114 of the secondary register region 112, the registers may be cleared after the register values have been read from both the primary register region 110 and the secondary register region 112.

As indicated above, the peripheral 100 may be coupled to one or more processors via the processor bus 102 that is communicatively coupled to the set of registers 104, including the primary register region 110 and the secondary register region 112. In some cases, the first signal and the second signal may be transmitted by any of the coupled one or more processors. For example, a first processor may transmit the first signal, setting certain values of the control registers 108 of the primary register region 110, and another processor (or the first processor) may transmit the second signal, setting corresponding values of the control registers 114 of the secondary register region 112.

Figure 2:
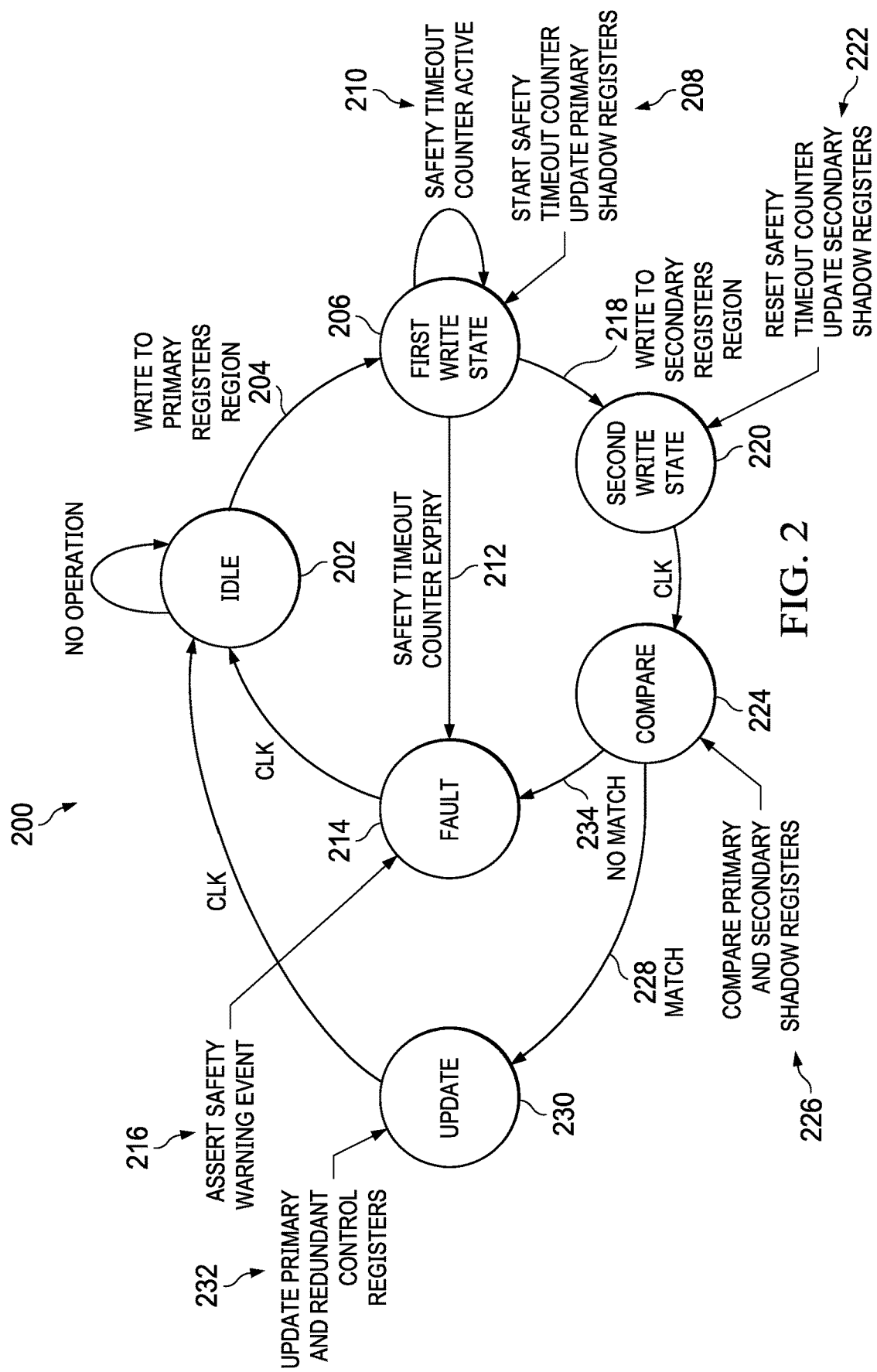
FIG. 2 is a state diagram of control path redundancy for a peripheral, in accordance with aspects of the present disclosure.

FIG. 2 is a state diagram 200 of control path redundancy for a peripheral, in accordance with aspects of the present disclosure. This example state diagram 200 may illustrate operating states of the FSC 130 of FIG. 1. At state 202, the FSC may be in an idle state, waiting for a first signal writing an update and/or change to the primary register region to be received by the peripheral. Once a write to the primary register region 204 is detected, the FSC may transition to a first write state 206. In the first write state 206, a safety timeout counter may be started and values written to the primary register region may be copied to the primary shadow register 208. The safety timeout counter may be active and adjusted (e.g., incremented or decremented) 210 based on the clock as the FSC waits to receive a second signal writing an update and/or change to the secondary register region. If the safety timeout counter expires 212 without a write to the secondary register region 218 being detected, the FSC enters a fault state 214. In the fault state 214, the FSC asserts a safety warning event 216 and then returns to the idle state 202.

While in the first write state 206, if a write to the secondary register region 218 is detected, the FSC may transition to a second write state 220. In the second write state 220, the safety timeout counter may be reset and values written to the secondary register region may be copied to the secondary shadow register 222. The FSC may then transition to a compare state 224, where values stored in the primary shadow register are compared to values stored in the secondary shadow register 226.

If the values stored in the primary shadow register match 228 the values stored in the secondary shadow register, then the FSC may transition to an update state 230, where the primary control registers and redundant control registers may be updated 232. The FSC may then return to the idle state 202.

If the values stored in the primary shadow register do not match 234 the values stored in the secondary shadow register, then the FSC may transition to the fault state 214, and the FSC may assert the safety warning event 216. The FSC may then return to the idle state 202.

Figure 3:
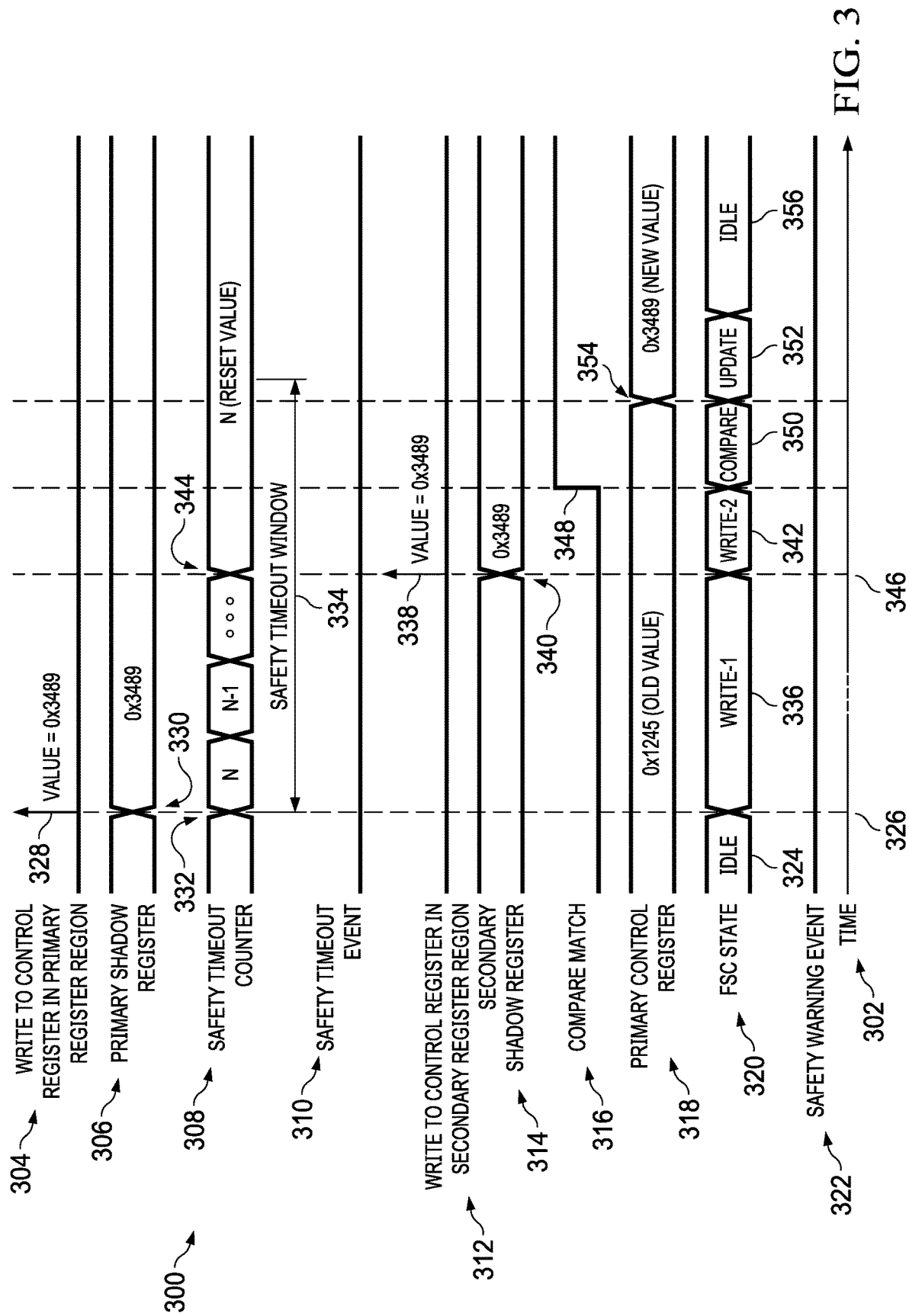
FIG. 3 is a timing diagram illustrating valid control register access, in accordance with aspects of the present disclosure.

FIG. 3 is a timing diagram 300 illustrating valid control register access, in accordance with aspects of the present disclosure. As shown, the timing diagram 300 includes, on a time axis 302, writes to a control register in a primary register region 304, writes to a primary shadow register 306, values of a safety timeout counter 308, safety timeout events 310, writes to a control register in a secondary register region 312, writes to a secondary shadow register 314, comparator match indication 316, primary control register values 318, FSC states 320, and safety warning event 322. As shown, the FSC state 320 is in an idle state 324 initially. At time 326, a write to a control register in the primary register region 328 occurs. In this example, the value of this write is 0x3489. This written value is copied 330 into the primary shadow register 306, and the safety timeout counter 308 is started 332. The safety timeout counter 308 counts out a safety timeout window 334. The FSC state 320 then transitions to a first write state 336.

Prior to the expiration of the safety timeout window 334, a write to a control register in the secondary register region 312 occurs 338 at time 346, and this written value is copied 340 into the secondary shadow register 314. The FSC state 320 also transitions to a second write state 342, and the safety timeout counter 308 is reset 344. In this example, the value of this write is also 0x3489.

The FSC state 320 may transition to the compare state 350, and values in the primary shadow register and secondary shadow register may be compared. An indication that the values match 348 may be raised based on the comparison. Based on the indication that the values match 348, the FSC state 320 may transition to the update state 352 and the primary control register 318 updated 354 with the new value, here 0x3489. After the primary control register 318 is updated, the FSC state 320 may transition back to the idle state 356.

Figure 4:
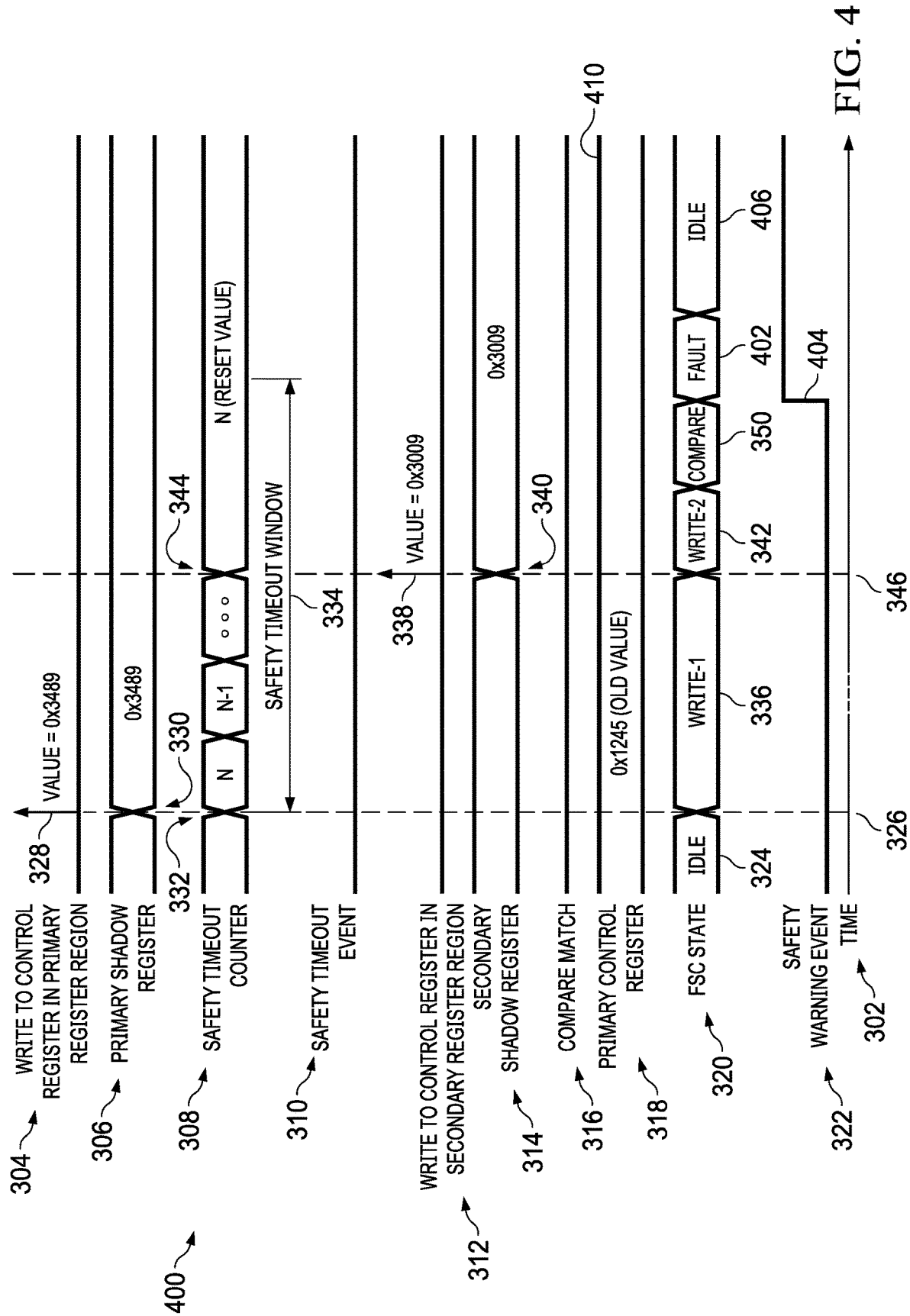
FIG. 4 is a timing diagram illustrating a control register access data mismatch, in accordance with aspects of the present disclosure.

FIG. 4 is a timing diagram 400 illustrating a control register access data mismatch, in accordance with aspects of the present disclosure. As with FIG. 3, timing diagram 400 includes, on a time axis 302, writes to a control register in a primary register region 304, writes to a primary shadow register 306, values of a safety timeout counter 308, safety timeout events 310, writes to a control register in a secondary register region 312, writes to a secondary shadow register 314, comparator match indication 316, primary control register values 318, FSC states 320, and safety warning events 322. As before, the FSC state 320 is in an idle state 324 initially. At time 326, a write to a control register in the primary register region 328 occurs. In this example, the value of this write is 0x3489. This written value is copied 330 into the primary shadow register 306, and the safety timeout counter 308 is started 332. The safety timeout counter 308 counts out a safety timeout window 334. The FSC state 320 then transitions to a first write state 336.

Prior to the expiration of the safety timeout window 334, a write to a control register in the secondary register region 312 occurs 338 at time 346, and this written value is copied 340 into the second shadow register 314. The FSC state 320 also transitions to a second write state 342, and the safety timeout counter 308 is reset 344. In this example, the value of this write is 0x3009, different from the value 0x3489 written into the primary control registers.

The FSC state transitions to the compare state 350. When the values in the primary shadow register and secondary shadow register are compared, a determination is made that the values do not match, and no indication that the values match is raised. As no indication that the values match is received by the FSC, the FSC state 320 transitions to a fault state 402, and a safety warning event 322 is raised 404. The FSC state 320 may then transition back to an idle state 406.

Figure 5:
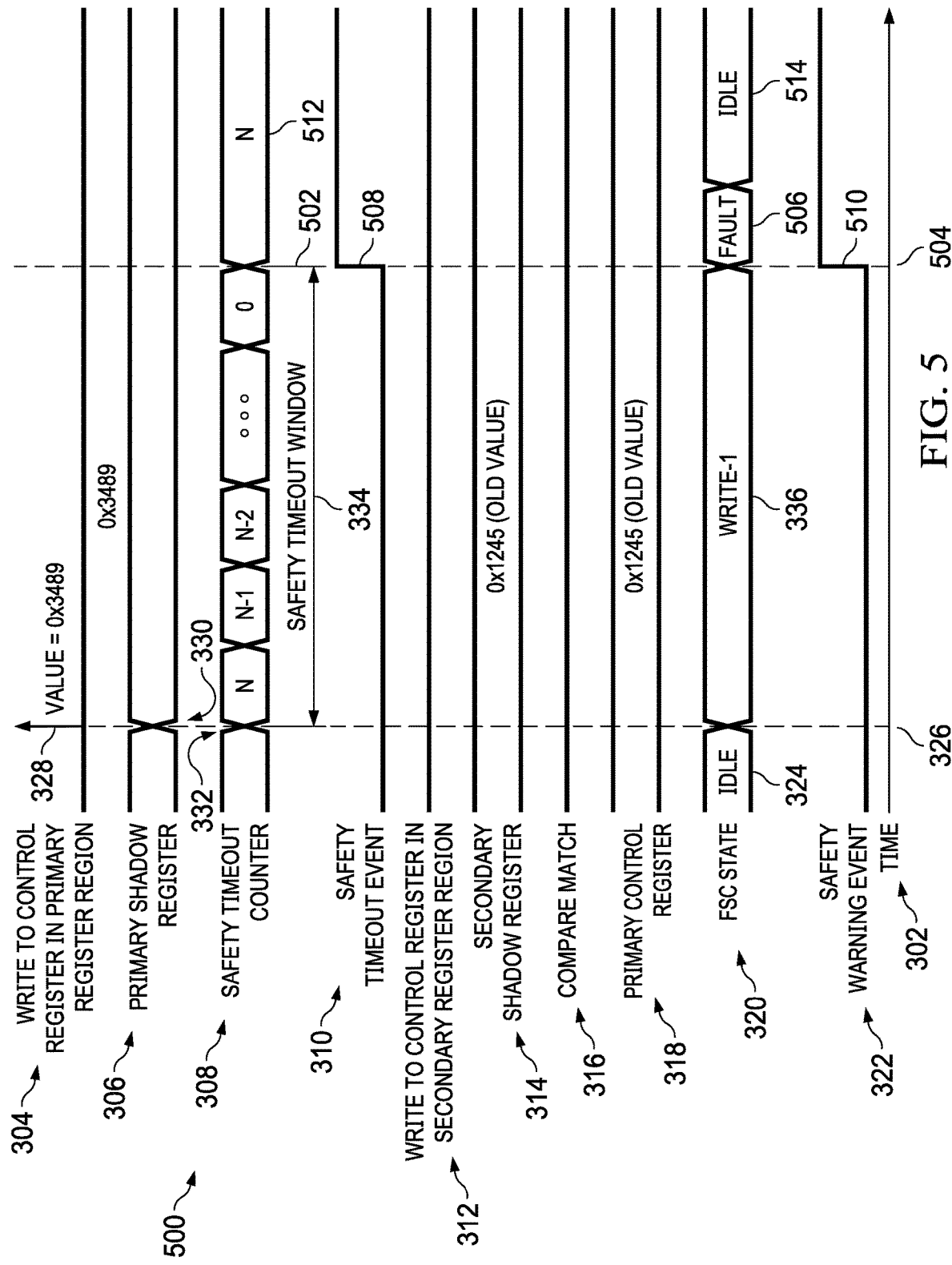
FIG. 5 is a timing diagram illustrating a safety counter timeout, in accordance with aspects of the present disclosure.

FIG. 5 is a timing diagram 500 illustrating a safety counter timeout, in accordance with aspects of the present disclosure. As with FIGS. 3 and 4, timing diagram 500 includes, on a time axis 302, writes to a control register in a primary register region 304, writes to a primary shadow register 306, values of a safety timeout counter 308, safety timeout events 310, writes to a control register in a secondary register region 312, writes to a secondary shadow register 314, comparator match indication 316, primary control register values 318, FSC states 320, and safety warning events 322. As before, the FSC state 320 is in an idle state 324 initially. At time 326, a write to a control register in the primary register region 328 occurs. In this example, the value of this write is 0x3489. This written value is copied 330 into the primary shadow register 306, and the safety timeout counter 308 is started 332. The safety timeout counter 308 counts out a safety timeout window 334. The FSC state 320 then transitions to a first write state 336.

In this example, a second signal is not received prior to the expiration of the safety timeout window 334, and the secondary register region and secondary shadow register 314 still retain their previous values, here 0x1245. When the safety timeout window 334 expires 502 at time 504, a safety timeout event 310 is raised 508, causing the FSC state 320 to transition to a fault state 506. The safety timeout counter 308 may be reset 512. The FSC may then raise 510 a safety warning event 322. The FSC state 320 may then transition to an idle state 514.

Figure 6:
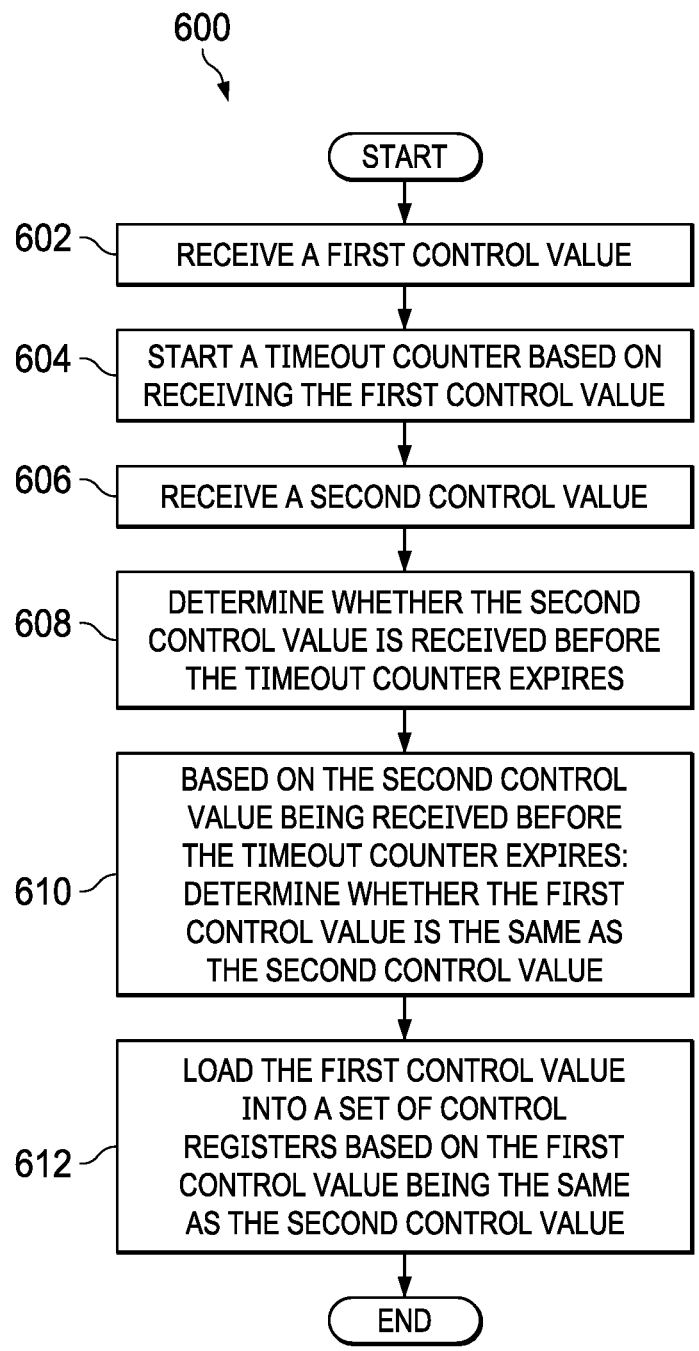
FIG. 6 is a flow diagram illustrating a technique for control path safety, in accordance with aspects of the present disclosure.

FIG. 6 is a flow diagram illustrating a technique 600 for control path safety, in accordance with aspects of the present disclosure. At block 602, a first control value is received. For example, a peripheral may include a set of registers. The set of registers may include a first set of control registers and a second set of control registers for receiving control values for the peripheral. A control signal including a first control value may be received when the first control value is written into the first set of control registers. At block 604, a timeout counter is started based on receiving the first control value. For example, a timeout counter is started when the first control value is written into the first set of control registers. In some cases, the timeout counter may be preconfigured, for example, at boot time of the peripheral. At block 606, a second control value is received. For example, a second control signal including a second control value may be received when the second control value is written into the second set of control registers. At block 608, a determination whether the second control value is received before the timeout counter expires is made. In some cases, the second control signal may not be received. If the second control signal is not received before the expiration of the timeout counter, then a safety event may be raised. In some cases, the safety event may be a warning event. In some cases, the safety event may be a fault event and/or other kind of event. This safety event may be transmitted to one or more processors, for example, via a processor bus. In some cases, a number of safety events may be determined and compared to a safety warning threshold. If the number of safety events exceeds the safety warning threshold, a safety fault event may be raised. In some cases, the peripheral may be reset if the number of safety events exceeds the safety warning threshold. At block 610, based on the second control value being received before the timeout counter expires, a determination whether the first control value is the same as the second control value is made. For example, where the second control value is received before the timeout counter expires, the first control value may be compared to the second control value to determine whether the values match. In some cases, if the first control value does not match the second control value, a safety event may be raised. When the first control value matches the second control value, at block 612, the first control value is loaded into a set of control registers based on the first control value being the same as the second control value. For example, the received first control value may be loaded into a set of registers that are actually used to control the peripheral.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Modifications are possible in the described embodiments, and other embodiments are possible, within the scope of the claims.

What is claimed is:

1. A circuit comprising:
   a primary register region and a primary shadow register;
   a secondary register region and a secondary shadow register; and
   a safety controller configured to:
      transition to a first write state when a first write signal to write a first value to the primary register region is detected, and copy the first value written to the primary register region to the primary shadow register;
      transition to a second write state when a second write signal to write a second value to the secondary register region is detected within a set amount of time of detection of the first write signal, and in the second write state, copy the second value written to the secondary register region to the secondary shadow register;
      transition to a compare state to receive a comparison signal indicating whether the first value is the same as the second value; and
      transition to an update state when the first value is the same as the second value.

2. The circuit of claim 1, further comprising:
   a timer configured to be activated when the first write signal is detected, and send a timeout signal to the safety controller when the second write signal is not detected within the set amount of time.

3. The circuit of claim 2, wherein the safety controller is configured to transition to a fault state in response to receiving the timeout signal, and assert a safety warning while in the fault state.

4. The circuit of claim 1, further comprising:
   a comparator coupled to the primary and secondary shadow registers, the comparator configured to compare the first value in the primary shadow register to the second value in the secondary shadow register and output the comparison signal.

5. The circuit of claim 4, wherein the safety controller is further configured to transition to a fault state when the comparison signal indicates that the first value is not the same as the second value, and assert a safety warning while in the fault state.

6. The circuit of claim 1, wherein the set amount of time is based on a value configured during a boot-up process for the circuit and locked from modification while the circuit is running.

7. The circuit of claim 1, wherein the timer is configured to be reset when the safety controller is in the second write state.

8. The circuit of claim 1, further comprising:
a primary control register coupled to the safety controller and the primary shadow register; and
a redundant control register coupled to the primary control register and the primary shadow register.

9. The circuit of claim 8, wherein, in the update state, the safety controller is configured to update the primary control register and the redundant control register with the value from the primary shadow register.

10. The circuit of claim 1, wherein each of the primary register region and the secondary register region is memory-mapped.

11. A circuit comprising:
primary and secondary register regions;
a plurality of pairs of registers, including a first pair of registers coupled to the primary and secondary register regions;
a plurality of comparators coupled to the plurality of pairs of registers, respectively, each comparator configured to compare values in one register of the corresponding pair of registers to respective values in the other register of the corresponding pair of registers and to output a corresponding comparison signal indicating whether the compared values are the same; and
a safety controller coupled to the plurality of comparators to receive the comparison signals, the safety controller having an output, the safety controller configured to assert a safety warning signal when any of the comparison signals indicate that the compared values are not the same.

12. The circuit of claim 11, wherein:
the first pair of registers includes a primary shadow register and a secondary shadow register,
a second pair of registers of the plurality of pairs of registers includes a primary control register and a redundant control register, and
a third pair of registers of the plurality of pairs of registers includes a primary status register and a secondary register.

13. The circuit of claim 12, wherein the plurality of comparators includes:
a first comparator having inputs coupled to the first pair of registers and an output coupled to the safety controller,
a second comparator having inputs coupled to the second pair of registers, the second comparator having an output, and
a third comparator having inputs coupled to the third pair of registers, the third comparator having an output.

14. The circuit of claim 13, further comprising:
a switch having inputs coupled to the outputs of the second and third comparators, respectively, the switch having an output coupled to the safety controller.

15. The circuit of claim 14, wherein, when the comparison signal output by either the second or third comparator indicates that the compared values are not the same, the switch is configured to output a transient fault signal to the safety controller.

16. The circuit of claim 15, further comprising:
a safety warning counter having an input coupled to the output of the safety controller, and an output; and
a fourth comparator having a first input coupled to the output of the safety warning counter, a second input configured to receive a safety warning threshold, and an output.

17. The circuit of claim 16, wherein the fourth comparator is configured to receive a value from the safety warning counter, compare the value received from the safety warning counter to the safety warning threshold, and output a safety fault event signal when the value from the safety warning counter exceeds the safety warning threshold.

18. The circuit of claim 16, wherein the safety warning threshold is configurable.

19. The circuit of claim 11, wherein each of the primary register region and the secondary register region is memory-mapped.

* * * * *